United States Patent [19]

O'Brien

[11] 3,800,325

[45] Mar. 26, 1974

[54] DISC DRIVE FOR MEMORY DISC CARTRIDGE

[75] Inventor: Terrence J. O'Brien, San Jose, Calif.

[73] Assignee: Callus Memories, Inc., San Jose, Calif.

[22] Filed: Aug. 14, 1972

[21] Appl. No.: 280,541

[52] U.S. Cl. .................. 360/98, 360/133, 346/137

[51] Int. Cl. .............................................. G11b 1/02

[58] Field of Search ............... 179/100.2 Z, 100.2 P; 340/174.1 C, 174.1 E; 346/137, 74 MD; 274/10, 41.4; 206/62 P

[56] References Cited

UNITED STATES PATENTS

| | | | |
|---|---|---|---|
| 3,487,390 | 12/1969 | Klinger et al. | 340/174.1 |
| 3,593,327 | 7/1971 | Shill | 340/174.1 |
| 3,566,381 | 2/1971 | Buslik et al. | 340/174.1 |
| 3,304,544 | 2/1967 | Johnson et al. | 340/174.1 |
| 3,631,423 | 12/1971 | Groom | 340/174.1 |
| 3,710,357 | 1/1973 | Buslik | 340/174.1 |

*Primary Examiner*—Vincent P. Canney
*Attorney, Agent, or Firm*—Lindenberg, Freilich & Wasserman

[57] ABSTRACT

A front loading disc drive in which a cartridge receiver pivotally mounted on the machine frame receives a standard memory disc cartridge and then lowers it so the memory disc of the cartridge rests on a drive spindle, wherein the cartridge receiver is a wire framework and the machine frame has raised precision surfaces for supporting the cartridge and has recesses between the precision surfaces into which the cartridge receiver is lowered so it drops away from the cartridge. The machine frame has a raised precision surface surrounding the spindle hole through while the spindle projects, and filtered air is blown under pressure thereunder so that only filtered air can leak into the central aperture of the cartridge. Another raised precision surface surrounds a filtered air outlet in the machine frame that lies under the cartridge air hole. Filtered air blown into the cartridge comes from a chamber beneath the cartridge, and an auxiliary memory disc is fixed to the spindle within this chamber so the auxiliary disc is bathed in filtered air.

11 Claims, 8 Drawing Figures

PATENTED MAR 26 1974

3,800,325

DISC DRIVE FOR MEMORY DISC CARTRIDGE

BACKGROUND OF THE INVENTION

This invention relates to memory disc drives of the type which are designated for use with memory disc cartridges whose housing substantially completely surrounds the memory disc even when the disc is driven.

Disc memory systems of the type which utilize replaceable magnetic discs, generally referred to as disc packs, have enjoyed wide useage in the computer field as memories which have relatively high capacity and relatively short access times. Recently, a disc memory system has been introduced which utilizes a cartridge consisting of a single magnetic disc mounted in a cartridge housing that completely surrounds the disc at all times. A front loading disc drive is utilized for this cartridge, and it employs a cartridge receiver pivotally mounted on a machine frame. The cartridge is loaded by opening a front door, raising the cartridge receiver, and inserting the cartridge into the receiver. When the cartridge receiver is lowered, the cartridge is lowered onto a drive spindle so the memory disc therein can be rotated, and a covering at the rear of the cartridge is opened to permit read/write heads of the drive to enter the cartridge and move along the rotating magnetic disc therein.

The disc cartridges have great advantages of simplicity of use and compactness. However, they have heretofore had several disadvantages. One disadvantage is that dust has more readily entered the cartridge than in previous disc packs wherein a dust cover was screwed or otherwise firmly mounted over the magnetic disc pack after it was installed in the drive. The presence of more dust has heretofore prevented reliable useage of the cartridges for high density information storage. The cartridges are provided with air doors, and the disc drives were provided with air outlets located opposite the cartridge doors for blowing filtered air therein. However, filtered air still leaked into the cartridge, so there was still a considerable dust problem. Air tends to leak into the cartridge because the rapidly rotating magnetic disc acts like a centrifugal pump, taking in air near its center and expelling it near the periphery so that any unsealed openings near the center tend to draw in surrounding air.

Another disadvantage of previous memory disc drives was that the moveable cartridge receiver had to be constructed and mounted at close tolerances. This is because the memory disc within the cartridge is not rotated on bearings within the cartridge housing, but instead is merely loosely held in place. When the cartridge is lowered onto the disc drive, the cartridge housing must be accurately held at a predetermined position while the spindle holds the memory disc at a slightly raised position so the disc can rotate within the cartridge housing without touching the walls of the housing. The pivotally mounted cartridge receiver therefore had to be manufactured to relatively close tolerances and had to be mounted accurately on the machine frame.

SUMMARY OF THE INVENTION

In accordance with one embodiment of the present invention, a disc drive is provided for use with a memory disc cartridge, which minimizes the amount of dust entering the cartridge during use, and which minimizes the cost of the cartridge receiver that moves the cartridge between the loading and drive positions. The disc drive includes a machine frame with an upper plate on which the cartridge receiver pivots, the plate having several raised precision surfaces for supporting the cartridge housing. The cartridge receiver is constructed as a wire framework which can be lowered into recesses of the upper plate so that it falls below the cartridge housing and thereby permits the cartridge housing to be supported only on precision surfaces of the machine frame. This permits the use of greater tolerances in the construction and mounting of the cartridge receiver while assuring even closer tolerances in the positioning of the cartridge during use.

The upper plate of the machine is provided with additional raised precision surfaces that minimize the leakage of unfiltered air into the disc cartridge. One of these precision surfaces surrounds an air outlet through which filtered air is pumped. This precision surface lies substantially against the cartridge walls that surround the air hole therein, to substantially eliminate the entrance of unfiltered air into the cartridge through the air hole. Another precision surface substantially surrounds the spindle aperture in the upper plate through which the drive spindle projects. This surface lies substantially against the walls of the central aperture in the cartridge housing which receives the spindle. The raised precision surface around the spindle aperture greatly decreases the inward flow of unfiltered air through the central aperture of the cartridge. In addition, a chamber is provided below the upper plate and surrounding the spindle, so that filtered air under pressure is pumped upwardly between the spindle and the walls of the spindle aperture.

The disc drive is constructed to not only receive replaceable memory disc cartridges, but also includes a permanently emplaced auxiliary memory disc. The machine frame defines a wide chamber beneath the upper plate, and the auxiliary disc is fixed to the spindle portion that projects through this chamber. Filtered air is pumped into this chamber to keep the auxiliary disc clean. Some of the filtered air in the chamber passes upwardly through the air outlets and into the cartridge to keep it clean. The spindle that supports the auxiliary disc and the disc of the cartridge, is rotatably mounted only on bearings lying below the auxiliary disc, so that there are no bearings in the spindle aperture of the upper plate that would interfere with the upward flow of filtered air through the spindle aperture therein.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
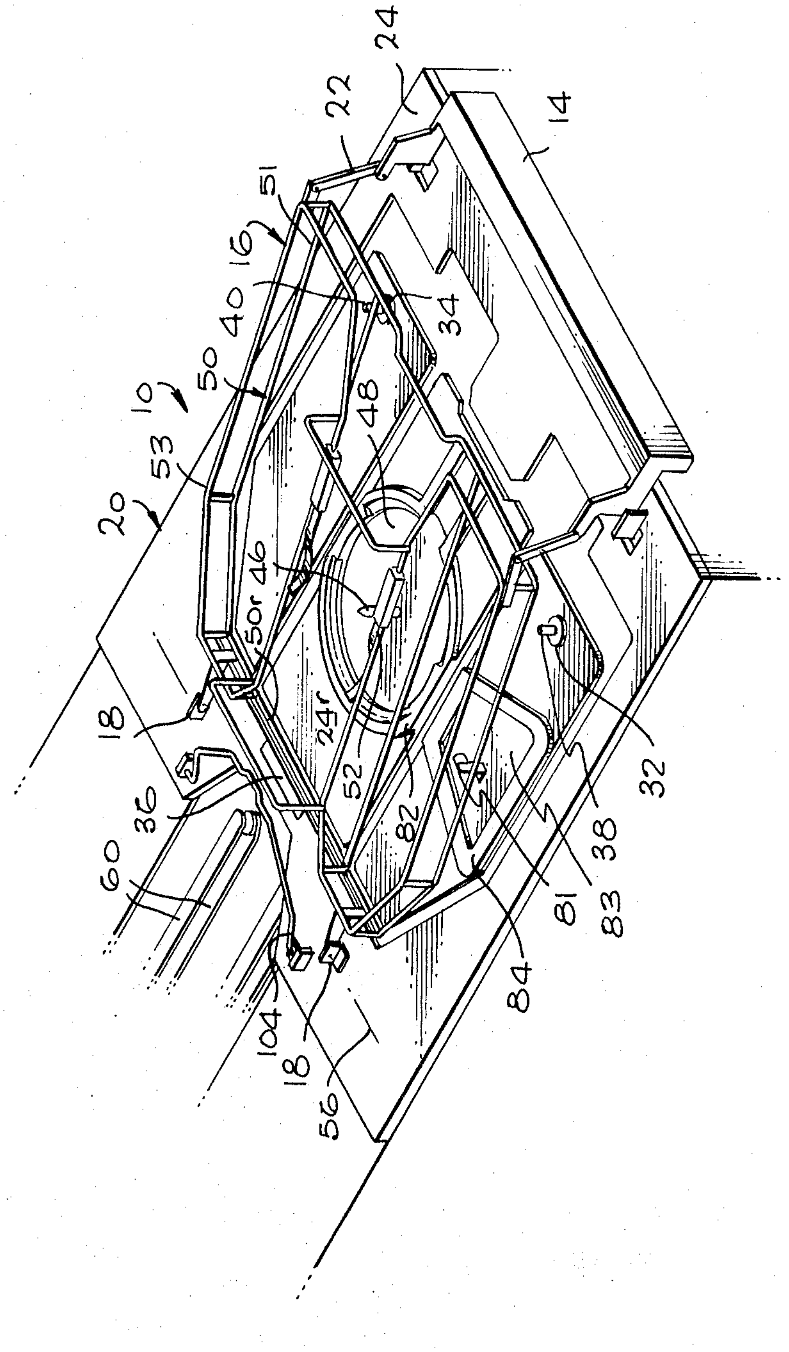
FIG. 1 is a partial perspective view of a disc drive constructed in accordance with the present invention, shown with the cartridge receiver in a raised position.
Figure 2:
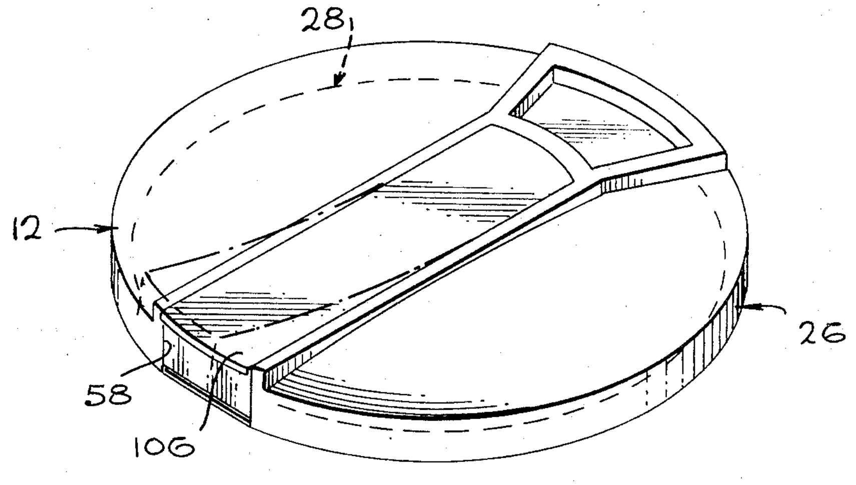
FIG. 2 is a perspective top view of a standard memory disc cartridge of the type used in the disc drive of FIG. 1.
Figure 2A:
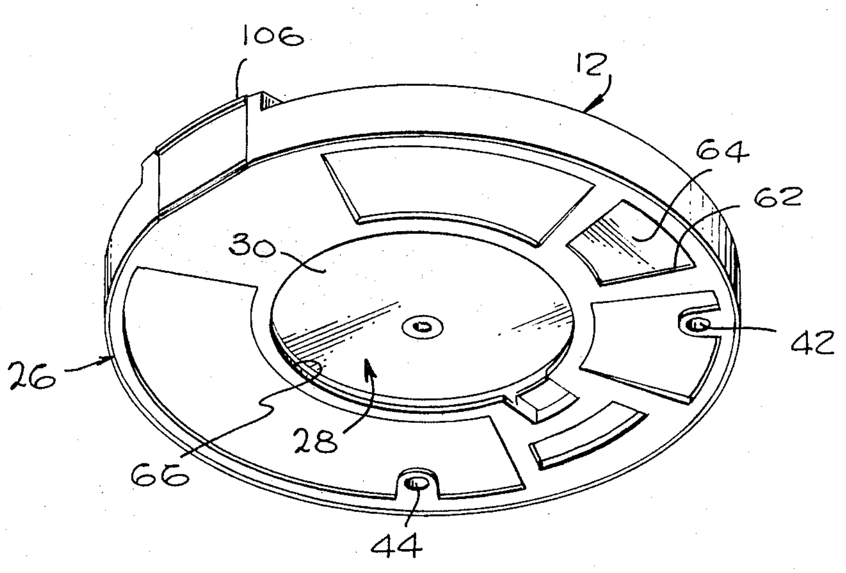
FIG. 2A is a perspective bottom view of the cartridge of FIG. 2.
Figure 3:
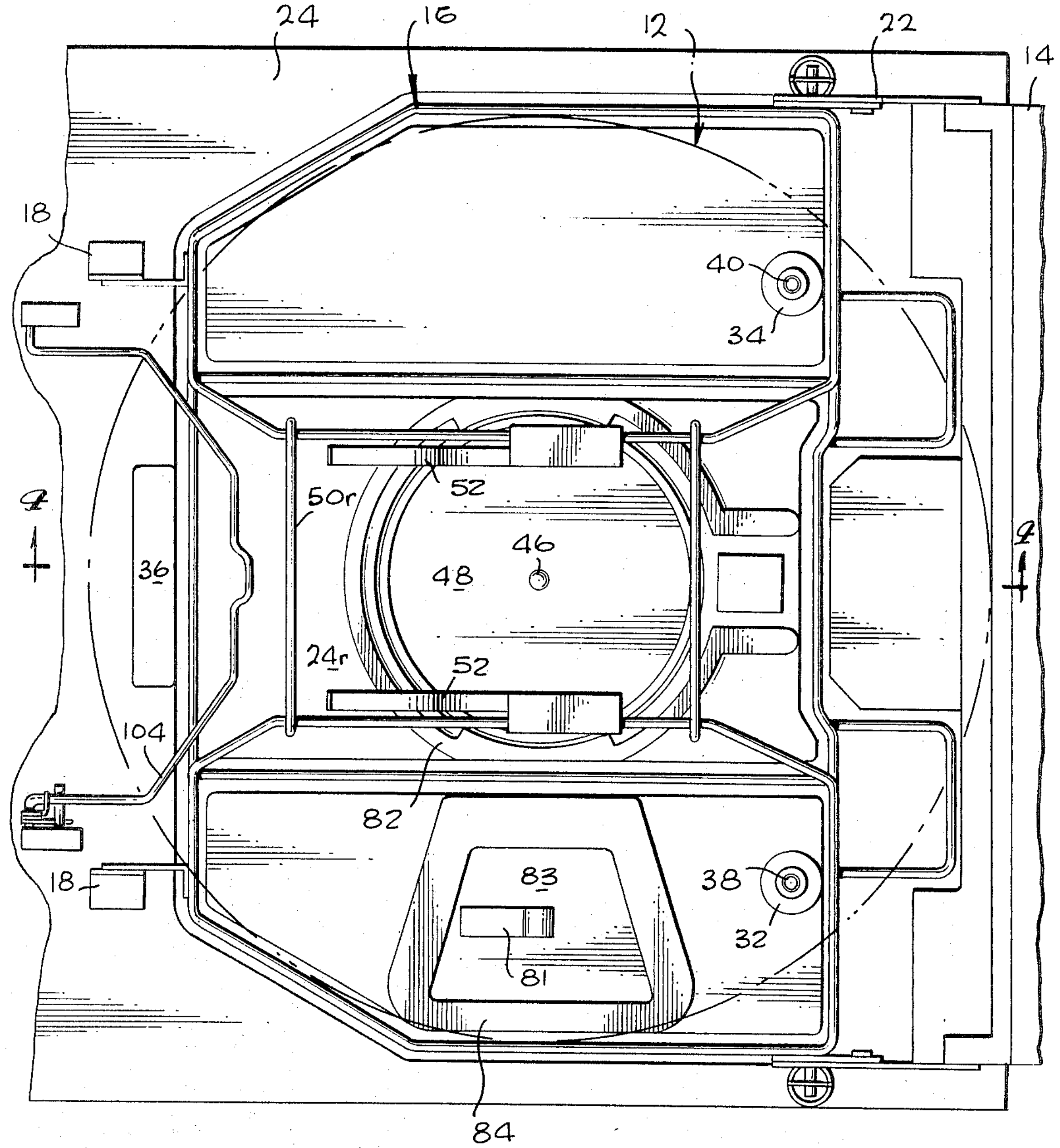
FIG. 3 is a plan view of the disc drive of FIG. 1.

FIG. 1 illustrates a disc drive 10 of the "front loading" type which is designed for use with a memory disc cartridge 12 illustrated in FIGS. 2 and 2A. The disc drive 10 may be installed in a cabinet (not shown) which encloses the drive except for a doorway opening in front of a door 14 at the front of the drive. An operator can open the door 14 to gain access to the front of a cartridge receiver 16, so that the cartridge 12 can be inserted into the receiver. The cartridge receiver has a rear end which is pivotally mounted on a pair of brackets 18 on the machine frame 20 of the drive, and has a front end connected by linkages 22 to the door 14. When the door 14 is opened, the front of the cartridge receiver 16 is raised above an upper plate 24 of the machine frame to facilitate the insertion of a cartridge. When the door 14 is pivoted to a closed position, the cartridge receiver 16 is lowered so that it lowers the memory disc cartridge onto the upper plate 24 of the machine frame.

As illustrated in FIGS. 1–5, the memory disc cartridge 12 includes a housing 26 and a memory disc assembly 28 which is mounted in the housing so that it can rotate therein. The disc assembly 28 includes a disc hub 30 and a magnetic disc 32 which is fixed to the hub. When the cartridge is lowered onto the machine frame 20, the cartridge housing 26 is supported on three precision surfaces of the machine frame that are spaced about the center of the cartridge housing, these being a pair of forward locating surfaces 32, 34 and a rear locating surface 36. A pair of pins 38,40 projecting upwardly from the forward locating surfaces are received in recesses 42, 44 in the cartridge housing to prevent rotation of the cartridge housing on the drive. The drive 10 also includes a spindle 46 with a spindle chuck or hub 48 that receives the memory disc hub 30 when the cartridge is lowered. The spindle hub 48 is at a height that causes it to support the memory disc 28 in a slightly raised position in its cartridge housing 26.

The memory disc assembly 28 is not rotatably mounted by bearings or the like on the cartridge housing 26. Instead, reliance is placed on the fact that the machine drive spindle 46 will support the disc in a slightly raised position within the cartridge housing so that the disc can rotate free of contact with inner surfaces of the housing. The memory disc can move only a small vertical distance within the cartridge, so that it is necessary to construct the drive so that the cartridge housing is held at a closely controlled height in relation to the spindle and that this height relationship be reliably maintained so that the magnetic disc never touches the housing when it is being rotated. In previous drives for this type of cartridge, accurate location of the cartridge housing was achieved by constructing the cartridge receiver to close tolerances. Also, a cartridge receiver design was used which assured great rigidity, and precision pivots were used to mount the cartridge receiver. These design approaches lead to considerable cost for the cartridge receiver and its pivotal mounts. The disc drive of the present invention is designed so that the cartridge receiver 16 can be constructed to relatively low tolerances and only moderate rigidity, and so that the pivots which connected it to the brackets 18 can be of only moderate precision. This is accomplished by designing the machine drive so that the receiver 16 "falls away" from the cartridge as the cartridge is lowered, and by providing precision machined surfaces on the machine frame 20 that serve to support all portions of the cartridge housing at a predetermined height.

Figure 4:
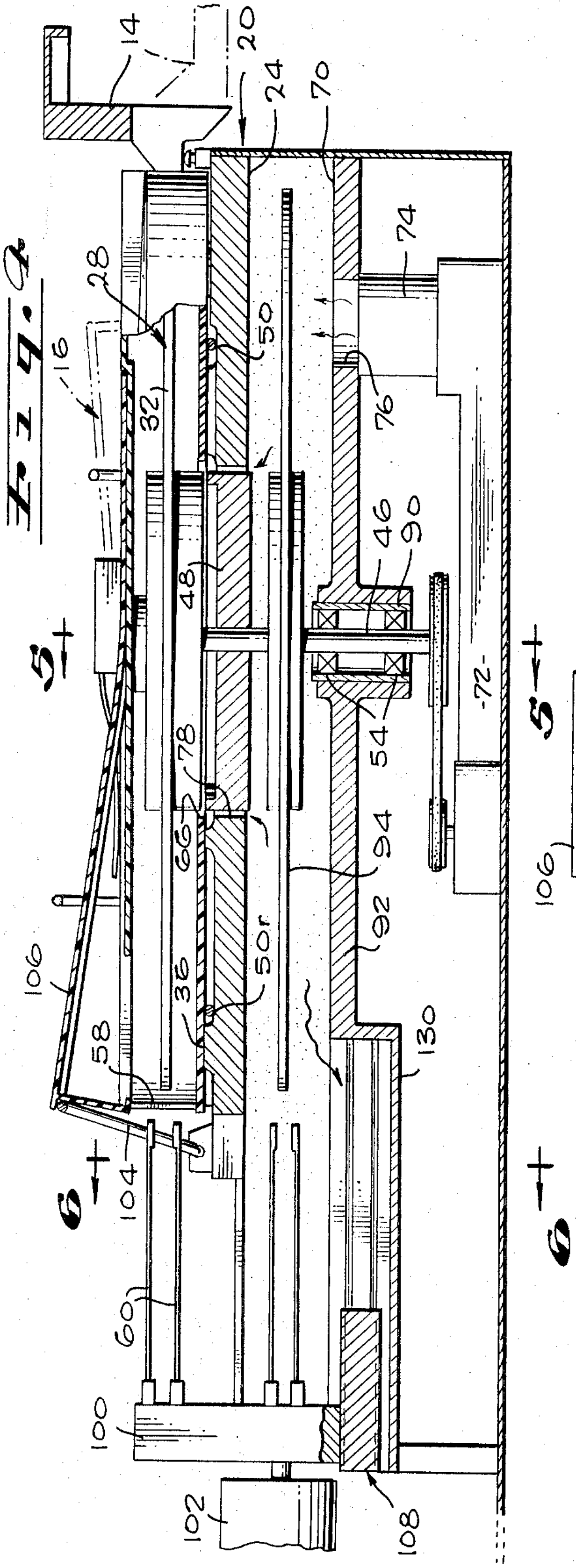
FIG. 4 is a sectional view taken on the line 4—4 of FIG. 3.
Figure 5:
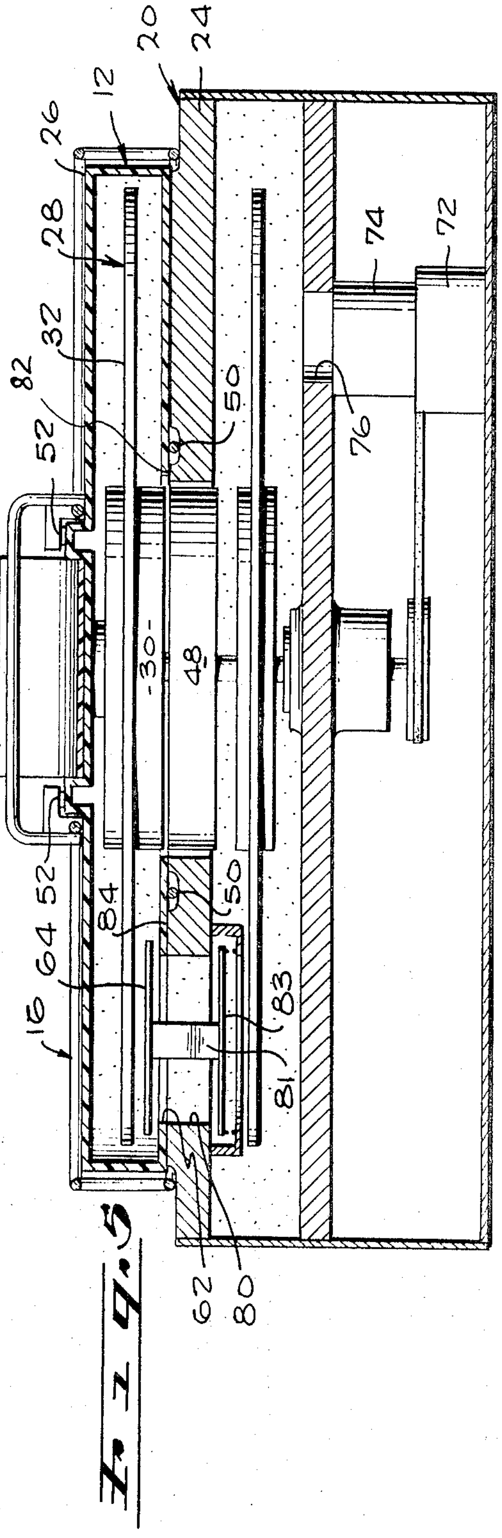
FIG. 5 is a view taken on the line 5—5 of FIG. 4.

The cartridge receiver 16 is constructed of a framework of rods, including a lower framework 50 that supports the lower surface of the cartridge housing when the cartridge housing is being lowered or raised on the drive 10. Side parts 51 and upper parts 53 of the receiver surround the cartridge. A pair of leaf springs 52 mounted at the top of the receiver urges the cartridge downwardly. When the cartridge reciever 16 is in its lowered position, as illustrated in FIGS. 4 and 5, the lower portion 50 of the cartridge receiver moves low enough so that all portions of it lie below the precision locating surfaces 32, 34, and 36 formed on the upper plate 24 of the machine frame. Accordingly, these precision locating surfaces determine the height of the cartridge housing, rather than it being determined by the cartridge receiver 16. The upper plate 24 of the machine frame is a stationary and rigid member whose position can be accurately maintained with respect to the bearings 54 that support the spindle, and the precision locating surfaces 32, 34, and 36 can be accurately machinedon the upper plate. Thus, the use of the precision locating surfaces on the upper plate of the machine frame plus the provision of recesses for receiving the lower framework 50 of the cartridge receiver, permits accurate locating of the cartridge housing in an economical and reliable manner.

The rear precision locating surface 36 which supports the rear end of the cartridge housing is not spaced far in front of the brackets 18 that pivotally support the cartridge receiver 16. This could present a problem, because it results in the rear end of the cartridge, that will rest on the support surface 36, not moving up and down very far as the cartridge receiver is raised and lowered. The cartridge receiver 16 is constructed to assure that all portions of the cartridge receiver move down low enough to fall away from the cartridge and thereby permit support of the cartridge only on precision surfaces of the machine frame. This is accomplished by constructing the lower framework 50 of the cartridge receiver so that the most rearward part 50*r* thereof, which contacts the lower surface of the cartridge housing, is spaced in front of the rear precision locating surface 36. This most rearward part 50*r* moves up and down appreciably, since it is spaced a considerable distance in front of the axis of pivoting 56 of the cartridge receiver on the machine frame. The machine frame forms a laterally extending recess 24*r* between precision surface 36 and another precision surface 82, to receive this laterally extending receiver part 50*r*.

The fact that the cartridge receiver 16 does not have to be precisely located allows further improvements in the drive. On previous drives for the cartridge, the cartridge receiver was not connected to the front door. This eliminated one source of misalignment of the cartridge receiver, but also resulted in an additional operation to be performed. In the drive of the present invention, the front door 14 is connected to the receiver 16 so they move together, so that loading and unloading of the cartridge is easier.

The use of an easy loading memory disc cartridge generally gives rise to the problem of controlling dust. When the memory disc assembly 28 is rapidly rotated by the drive spindle, it acts like a centrifugal pump that discharges air through an opening 58 at the periphery of the housing through which read/write head assemblies 60 move, and which sucks in air at locations radially inward of the periphery and particularly near the axis of rotation. If the amount of dust flowing along the rotating disc can be reduced to a low level, then the read/write heads can fly closer to the magnetic disc surface and the drive can function more precisely. This permits high density recording of information on magnetic discs. In order to minimize the flow of dust along the disc, the cartridge is provided with an air hole 62 (FIG. 2A) which is is covered by an air door 64 during storage of the cartridge. When the cartridge is installed on a drive, the air door 64 is lifted against a stop in the cartridge so that air can flow through the air hole 62. A blower assembly with a filter can be positioned on the machine frame with an outlet directed against the air hole 62 of the cartridge to blow filtered air therein, so that most of the air passing along the magnetic disc is filtered air. Although this arrangement of previous drives has reduced the amount of dust flowing across the rotating disc, there has still been a substantial dust problem. This is because considerable unfiltered air also could be sucked into the cartridge. Even though this additional air is small compared to the filtered air passing through the air hole, it can contain a high enough concentration of dust particles to greatly increase the amount of dust passing across the disc.

One region of the cartridge in which substantial amounts of unfiltered air has heretofore still been able to enter, is through the central opening 66 at the bottom of the disc cartridge housing, where the spindle hub 48 is received. This aperture 66 must be made somewhat larger than the spindle hub 48 to prevent rubbing, so there is considerable space for air to enter the cartridge therein. Since this region is relatively close to the axis of rotation of the disc, considerable suction is created that can draw in air.

Another region of the cartridge where unfiltered air previously could be drawn in is through the air hole 62 in the cartridge, which is the same opening through which filtered air is blown. In previous drives, the bottom surface of the cartridge housing 26 rested on the moveable cartridge receiver at all times, and the filtered air outlet had to be spaced a distance below the cartridge receiver. As a result, there was a substantial spacing between the top of the filtered air outlet and the bottom surface of the cartridge walls surrounding the air hole 62. Some unfiltered air flowed into the air hole 62 along with the filtered air that was blown therein, and a relatively high concentration of dust particles in this unfiltered air contributed to the amount of dust flowing across the rotating disc.

The disc drive of the present invention is constructed to greatly reduce the amount of unfiltered air that can enter through the central aperture 66 of the cartridge housing, or that can pass along with filtered air through the air hole 62. This is achieved by substantially sealing off these openings from the inflow of unfiltered air and by blowing filtered air into both of these openings. As illustrated in FIGS. 4 and 5, the machine frame 20 is constructed so that it forms a chamber 70 beneath the upper plate 24. An air blower 72 which includes a filter 74, blows filtered air through an inlet 76 into the chamber 70. Some of this filtered air flows through a spindle hub aperture 78 in the upper plate around the spindle hub 48 that lies therein, and from there leaks through the central aperture 66 in the cartridge housing. Additional filtered air flows from the chamber 70 through a filtered air outlet 80 which is aligned with the air hole 62 in the cartridge. As the cartridge is lowered into place, the air door 64 presses on an opening member 81 that normally seals the filtered air outlet 80, so that both the cartridge air door and an upwardly biased cover 83 under the outlet 80 are opened.

In order to prevent the leakage of unfiltered air into the central aperture 66 and air hole 62 of the cartridge, raised, flat precision surfaces 82, 84 are provided on the upper plate 24 which surround the central aperture 66 and air hole 62 of the cartridge housing. The lower framework 50 of the cartridge receiver drops below these precision surfaces 82, 84 when the cartridge receiver is in its lowered position. As a result, these precision surfaces 82, 84 lie substantially against the lower surface of the cartridge housing, so that there is very little space for the entrance of unfiltered air into the central aperture and air hole of the cartridge housing. The fact that the cartridge housing is supported on other precision machine surfaces of the upper plate 24 means that the location of the cartridge housing is accurately determined, so that these raised surfaces 82, 84 can lie very close to the lower surface of the cartridge to largely seal the openings.

The blowing of filtered air into the radially inward cartridge openings at the central aperture 66 and air hole 62, in combination with the substantial sealing of the filtered air passageways leading to these cartridge openings, greatly reduces the inflow of unfiltered air into the cartridge. This great reduction of unfiltered air means that a much lower amount of dust can be maintained in the air sweeping across the disc. As a result, the cartridge and drive assembly can operate with greater precision, and higher density magnetic disc recording can be utilized.

In order to facilitate the upward flow of filtered air through the spindle hub aperture 78 in the upper plate, the spindle 46 is mounted only on the bearings 54 which lie a distance below the upper plate 24. The bearings 54 are held in a precision tube 90 that is held in a lower plate 92 of the machine frame. The portion of the spindle 46 which extends through the chamber is utilized to hold an additional, or auxiliary magnetic memory disc 94 that is permanently fastened to the spindle. Only a minimal additional cost is involved in adding the permanently emplaced memory disc, because the same motor and spindle apparatus can be used to drive it as is used for the replaceable cartridge, and the chamber 70 for holding filtered air beneath the cartridge serves to hold the auxiliary disc and bathe it in filtered air.

Figure 6:
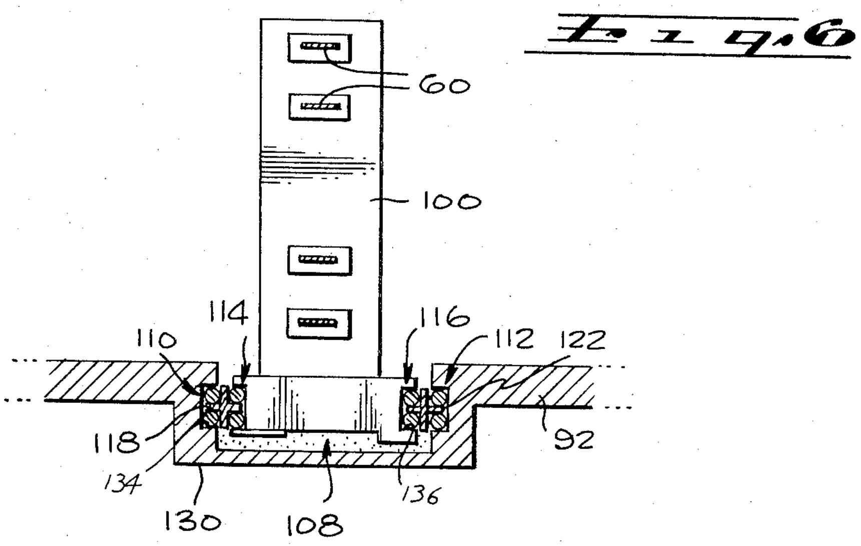
FIG. 6 is a view taken on the line 6—6 of FIG. 4.
Figure 7:
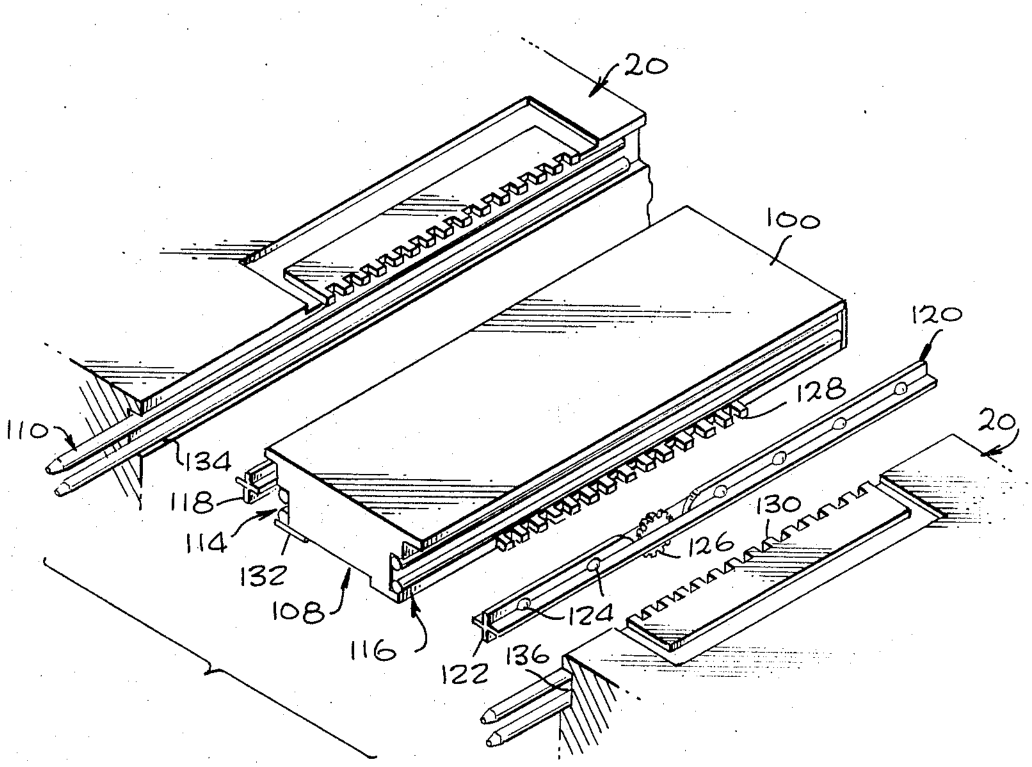
FIG. 7 is a partial, exploded, perspective view of the head bearing apparatus of the disc drive of FIG. 1.

The head assemblies 60 which carry read/write heads are mounted on a carriage 100 that is moved by a solenoid drive 102. When the cartridge receiver 16 is lowered, an opening bar 104 automatically lifts a cover member 106 of the cartridge housing to provide access for the heads to move into the cartridge. The carriage 100 is slideably supported on a bearing structure 108 that guides it in sliding movement along the disc. It is necessary to guide the carriage 100 with high precision so that the position of the heads with respect to the discs is accurately known, and therefore information can be reliably recorded and read out at high densities. FIGS. 6 and 7 illustrate some of the details of the bearing assembly 108, which includes two pairs of support rods 110, 112 mounted on the machine frame 20, two pairs of carriage rods 114, 116 mounted on the carriage 100, and a pair of guides 118, 120 positioned between adjacent pairs of support and carriage rods. Each guide, such as guide 120, includes a cruciform member 122 and several balls 124 trapped in position but freely rotatable on the cruciform member. The balls 124 contact the carriage rods 116 and support rods 112 to slideably support the carriage on the machine frame. A gear 126 rotatably mounted on each cruciform member 122 engages a pair of racks 128, 130 located respectively on the carriage and machine frame, to maintain the position of the guide 120. A looseness-eliminating spring leaf 132 that is fixed to the carriage 100 and that upwardly biases the lower rod of the pair of carriage rods 114, preloads the bearing apparatus to eliminate looseness.

One source of inaccuracies in carriage positioning is dust that may lie on the support rods 110, 112 or carriage rods 114, 116. For example, if the carriage 100 is directed to a position wherein one of the balls 124 lies on a dust particle, the ball may tend to roll in front or behind the dust particle, and thereby cause a small inaccuracy in the carriage position. In order to minimize errors in positioning caused by the presence of dust particles, the bearing apparatus 108 is located along a channel portion 130 formed in the machine frame and which has an end open to the filtered air chamber 70. The channel 130 is closed on three sides, so that filtered air received from the chamber 70 flows largely along the length of the channel. This filtered air flow tends to keep the bearing assembly 108 bathed in filtered air and tends to carry away any dust particles that might have found their way onto one of the rods. The amount of dust in the vicinity of the bearings is thereby minimized, so that accuracy of head position can be better maintained.

In previous disc drives, the accuracy of head positioning was often affected by improper mounting of the carriage guide apparatus on the machine frame. Carriage guides largely similar to that shown in FIG. 7 were used, but with the support rods 110, 112 mounted in support rod holders that were fastened by bolts or other fasteners to the machine frame. The support rod holders could be accurately mounted on the machine frame at the factory. However, the positions of the support rod holders could change over a long period of usage, and furthermore, any removal and remounting in the field could result in substantial inaccuracies. The precise alignment of the support rods 110, 112 with the drive spindle 46 is important if the position of the read/write heads is to be accurately known. In accordance with the present invention, the support rods 110, 112 are mounted in grooves 134, 136 that are formed in a portion of the machine frame which is integral with the lower plate 92 of the machine frame on which the spindle bearings are mounted. This eliminates the possibility of shifting of the support rods with respect to the spindle, so that the precision alignment established at the factory is maintained during the life of the machine.

Thus, the invention provides a disc drive for use with a standard memory disc cartridge, which assures high precision operation by greatly reducing the dust level, and which accomplishes this in an economical design. Dust at the surface of the magnetic memory disc in the cartridge is minimized by blowing filtered air into the central aperture of the cartridge that received the drive spindle, as well as conventionally through the air door. In addition, the filtered air outlets to the cartridge holes which receive the filtered air are substantially sealed to minimize the amount of unfiltered air that can also be drawn into these cartridge openings. Such sealing is accomplished by utilizing a cartridge receiver that drops away from the cartridge when the cartridge is lowered in the machine, and by providing raised precision surfaces on the machine frame that lie substantially against the lower surface of the cartridge around the openings therein. The cartridge receiver which pivots up and down on the machine is constructed and mounted to only moderate tolerances, and therefore in an economical manner. This is accomplished by providing precision surfaces on the machine frame to support the cartridge when the cartridge receiver is lowered, and by providing recesses in the machine frame that permit the cartridge receiver to drop away from the cartridge. The spindle which drives the memory disc in the cartridge is also utilized to drive a permanently emplaced memory disc, and cleanliness of both discs is economically provided by mounting the permanently emplaced disc in a chamber below the cartridge, and by blowing filtered air into this chamber and allowing filtered air from this chamber to serve as the filtered air supply that flows into the cartridge.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A memory disc drive for use with a disc cartridge that includes a cartridge housing with front and rear portions and upper and lower surfaces and a pair of locating recesses on either side of the front portion, a disc hub that can rotate within the cartridge, and a memory disc fixed to the hub comprising:

a rigid stationary machine frame with a pair of locating projections for receiving the locating recesses of the cartridge;

a spindle rotatably mounted on said machine frame and having a spindle hub for engaging the disc hub of the memory disc;

a cartridge receiver having a rear end portion, an open front end, and a lower portion formed to receive said cartridge by inserting the cartridge through the open front end of the receiver;

means pivotally mounting the rear end portion of the receiver on said machine frame for pivoting the receiver between a raised position wherein the cartridge can be received and a lowered position wherein the disc hub of the cartridge rests on the spindle hub and the walls at said locating recesses of said cartridge housing rest on the locating projections on said machine frame;

said machine frame having a precision support surface formed thereon and located to support the rear portion of the lower surface of the cartridge when the receiver is in the lowered position, the most rearward part of said receiver which contacts the lower surface of the cartridge housing lying in front of said precision support surface, and the machine frame having a recess that receives said rearward receiver part below the level of said precision machined surface so that said rearward receiver part lies spaced beneath the lower cartridge surface when the receiver is in its lowered position, whereby the receiver falls away from the cartridge to permit the precision machined surface to support it at an accurately determined height.

2. The drive described in claim 1 wherein:

said machine frame has a spindle aperture with walls surrounding said spindle hub and has a second precision surface surrounding most of said spindle aperture for lying substantially against said disc cartridge; and including means for blowing filtered air upwardly between said spindle hub and said second precision surface; and wherein said machine frame defines a depression between the rear of said second precision surface and the front end of said first precision surface; and said cartridge receiver includes a framework with a narrow elongated laterally extending member which is received in said depression between said precision surfaces, said member lying below said precision surfaces when the receiver is in said lowered position.

3. The drive described in claim 1 wherein:

said disc cartridge has walls defining an air opening in its lower surface and has an air door biased towards a closed position on the cartridge housing, and said machine frame has a second precision surface with a hole in it which lies substantially against the walls of the cartridge housing surrounding the air opening so there is substantially no gap therebetween; and including a second cover mounted on said machine frame beneath said second precision surface for closing the hole therein;

means for upwardly biasing said second cover;

an opening member mounted on said second door and extending upwardly therefrom through said hole in said second precision surface, to push apart both covers so they both open; and means for blowing filtered air through the hole in said second precision surface.

4. A memory disc drive for use with a disc cartridge that includes a cartridge housing with front and rear ends and upper and lower surfaces, and a memory disc that can rotate within the housing, comprising:

a rigid machine frame having at least three raised precision surfaces and having a plurality of depressions between said raised surfaces;

a spindle rotatably mounted on said frame for engaging the memory disc of a disc cartridge;

means for rotating said spindle; and a cartridge receiver pivotally mounted on said frame for movement between raised and lowered positions thereon, said receiver including a lower framework of elongated members which support the lower surface of the cartridge housing when the disc cartridge is placed on the receiver while the receiver is in the raised position, and having means for biasing the cartridge downwardly against the lower framework, said lower framework fitting in the recesses between said raised precision surfaces and lying below them when the receiver is in the lowered position, so that the cartridge housing is pressed down and rests on the precision surfaces.

5. The disc drive described in claim 4 wherein:

said precision surfaces include a rear precision surface which is located to engage the rear end of the cartridge housing; and said receiver has a rearward portion pivotally mounted on said frame, and the most rearward portion of said lower framework which can support the cartridge housing is spaced in front of said rear precision surface.

6. A memory disc drive system comprising:

a disc cartridge that includes a cartridge housing with a central aperture in its lower surface and means defining an opening near its periphery, a disc hub, and a memory disc fixed to the hub, the hub and disc rotatable within the housing with their center aligned with said housing aperture;

a machine frame having a rigid upper plate with a spindle hub aperture therein and having a substantially enclosed chamber beneath said upper plate, said cartridge lying on said machine frame;

a spindle rotatably mounted on said machine frame and having a spindle hub in said machine frame aperture which engages the disc hub of the disc cartridge;

means for rapidly rotating said spindle;

said upper plate of the machine frame having a precision sealing surface which immediately surrounds most of said spindle hub aperture and which substantially engages the surface of the cartridge housing which surrounds the central aperture therein; and an air blower which includes a filter for blowing only filtered air, said blower having an outlet coupled to said chamber of said machine frame, whereby air the leaks into the cartridge housing through the central aperture therein is filtered.

7. A memory disc drive for use with a disc cartridge that includes a cartridge housing with a central aperture in its lower surface, an air hole in its lower surface spaced from said central aperture, an air door biased toward a closed position on said air hole, and a memory disc assembly rotatable within the housing with its center over the housing aperture, comprising:

a machine frame having a substantially enclosed chamber and an upper plate at the top of the chamber, said upper plate having a spindle aperture therein and an air outlet aperture therein;

a cover biased toward a closed position on said air outlet aperture;

a spindle having portions within said enclosed chamber and in said spindle aperture of the upper plate;

means for rotatably supporting said spindle on said frame;

means for rotating said spindle;

an auxiliary memory disc mounted on said spindle within said enclosed chamber;

means responsive to the reception of a disc cartridge on said machine frame for opening said air door of the cartridge and moving said cover to an open position on said air outlet aperture; and an air blower which includes a filter for blowing only filtered air, said blower having an outlet coupled to said chamber of said machine frame, whereby the memory disc in the chamber is protected against dust when not in use and both it and the disc in the cartridge are bathed in filtered air with a single blower.

8. The memory disc drive described in claim 7 wherein:

said means for rotatably supporting the spindle on the frame lies under said auxiliary memory disc, and there is a clearance between said spindle and the walls forming the spindle aperture in said upper plate; and said upper plate of the machine frame has a precision sealing surface surrounding most of said spindle aperture for substantially engaging the surface of the cartridge housing which surrounds the central aperture therein, whereby to flow filtered air into the cartridge through the central aperture therein.

9. The memory disc drive described in claim 7 wherein:

said upper plate of the machine frame includes a raised precision surface surrounding said air outlet; and including a cartridge receiver moveable between raised and lowered positions over said upper plate, and having a cartridge supporting portion that moves below the level of said raised precision surface when the receiver is in its lowered position, so that the walls of the cartridge housing immediately surrounding said air hole therein can lie substantially against said support surface.

10. The memory disc drive described in claim 7 wherein:

said frame defines an elongated passageway which is sealed around most of its periphery and which extends from the periphery of said chamber; and including slider bearing means mounted in said passageway; and a memory head assembly including a head support extending through said passageway and slideably mounted on said slider bearing means, whereby to minimize the loss of filtered air and to keep the slider bearing means clean.

11. A memory disc drive for use with a disc cartridge that includes a cartridge housing with a central aperture in its lower surface, a flat lower surface region with an air hole therein spaced from said aperture, and a memory disc assembly rotatable within the housing with its center over the housing aperture comprising:

a machine frame having a spindle aperture and an air outlet, said frame having a raised flat precision surface surrounding said air outlet;

means for blowing filtered air up through said air outlet;

a cartridge receiver mounted on said frame for movement between raised and lowered positions on said upper plate, said receiver having a cartridge supporting portion that moves below the level of said raised flat precision surface when the receiver is in its lowered position, so that said flat region of the cartridge which surrounds the air hole therein can lie against said precision surface, whereby to minimize the entrance of unfiltered air through said air hole.

* * * * *